US006183710B1

(12) United States Patent
Rogers et al.

(10) Patent No.: US 6,183,710 B1
(45) Date of Patent: Feb. 6, 2001

(54) SODIUM CYANIDE PASTE COMPOSITION

(75) Inventors: Janet Marie Rogers, Beaumont, TX (US); Thomas Peter Tufano, Wilmington, DE (US)

(73) Assignee: E. I du Pont de Nemours and Company, Wilmington, DE (US)

( * ) Notice: Under 35 U.S.C. 154(b), the term of this patent shall be extended for 0 days.

(21) Appl. No.: 09/287,945

(22) Filed: Apr. 8, 1999

(51) Int. Cl.[7] .................... C01C 3/08; B01D 11/00
(52) U.S. Cl. .................... 423/265; 423/29; 423/275; 423/371; 423/379; 423/658.5
(58) Field of Search .................... 423/29, 371, 379, 423/658.5, 265, 275

(56) References Cited

U.S. PATENT DOCUMENTS

| 2,726,139 | * | 12/1955 | Oliver ................ 423/379 |
| 2,993,754 | * | 7/1961 | Jenks et al. ............ 423/379 |
| 3,365,270 | * | 1/1968 | Guerin ................ 423/379 |
| 3,653,820 | * | 4/1972 | Kobs et al. ............ 423/379 |
| 4,083,935 | * | 4/1978 | Makar ................ 423/379 |
| 4,267,159 | * | 5/1981 | Crits ................ 423/371 |
| 4,847,062 |   | 7/1989 | Rogers et al. ........ 423/379 |
| 4,902,301 | * | 2/1990 | Rogers et al. ........ 423/371 |

FOREIGN PATENT DOCUMENTS

| 1143798 | * | 2/1963 | (DE) ................ 423/379 |
| 1012917 |   | 12/1965 | (GB) . |

* cited by examiner

*Primary Examiner*—Wayne Langel
(74) *Attorney, Agent, or Firm*—Lucas K. Shay

(57) ABSTRACT

A sodium cyanide composition having a paste-like consistency is provided which comprises sodium cyanide, a base, water, and a rheology modifier. Also provided are processes for producing and using the composition. The composition can be used in applications that require sodium cyanide solution.

21 Claims, No Drawings

SODIUM CYANIDE PASTE COMPOSITION

FIELD OF THE INVENTION

This invention relates to a sodium cyanide composition, to a process for producing the composition, and to a process for using the composition.

BACKGROUND OF THE INVENTION

Sodium cyanide (NaCN) has a variety of uses. For example, it is used in electroplating, treating metal surfaces, extracting and recovering precious metals from ores, and a number of other chemical applications. The use of NaCN in the leaching of ores that contain precious metals, such as gold and silver, is especially well known in the art.

The production of NaCN for the above use is accomplished by the so-called "wet" process, wherein hydrogen cyanide (HCN) is neutralized with aqueous sodium hydroxide (NaOH) solution, followed by evaporative crystallization to produce a slurry of NaCN crystals. The NaCN crystals are separated from the slurry, dried, and usually formed by dry compression methods into briquettes. The resulting briquettes are about 99 weight percent anhydrous NaCN.

The briquettes are shipped to consumers generally in containers designed to exclude exposure to atmospheric air since the anhydrous NaCN is very hygroscopic and can absorb substantial quantities of water when exposed to atmospheric air. If exposed to atmospheric air, serious difficulties in shipping and storage can result due to caking. Also, there is the added cost of excluding atmospheric air.

The majority of consumers generally convert the NaCN briquettes into an aqueous solution. They dissolve the NaCN, sometimes after breaking the briquettes into smaller particles, to produce a solution containing about 20 to 25 weight percent NaCN. To avoid hydrolysis with the resulting evolution of hazardous hydrogen cyanide vapors, an alkali such as NaOH is added to the dilution water. Sufficient alkali should be added to raise the resulting solution pH to about 12 or higher.

To avoid difficulties and cost associated with storage of the anhydrous product and industrial hygiene hazards due to generation of respirable dust when handling anhydrous NaCN briquettes or breaking the briquettes into smaller particles, some of the larger consumers have changed to direct solution storage. This has been accomplished by dissolution of the briquettes in the shipping container, usually tank trucks or railway cars, or in a storage tank, and unloading the resulting solution into storage tanks.

The manufacture of briquettes has the disadvantages of added investment and operating cost associated with concentrating, separating, drying and compacting anhydrous NaCN only to dissolve and dilute it prior to use. It would thus appear that direct shipment of NaCN solution, particularly where the NaCN production facilities are located in reasonable proximity of the consumer, would be highly desirable. However, the shipment of NaCN solution presents high shipping costs and a high environmental risk of spills in the event of an accident during transportation.

Anhydrous crystals of NaCN can be prepared by a number of processes known in the art. For example, McMinn, U.S. Pat. No. 2,708,151 and Oliver, U.S. Pat. No. 2,726,139, disclose processes for reacting substantially pure HCN with substantially pure NaOH to form solutions containing NaCN. Mann, et al., U.S. Pat. No. 3,619,132; Cain, U.S. Pat. No. 2,616,782; Mittasch, et al., U.S. Pat. No. 1,531,123; and Rogers, et al., U.S. Pat. No. 4,847,062 disclose processes for preparing NaCN employing impure starting materials. Isolating dry crystals of NaCN from reaction solution presents the hazards of exposing to harmful dust of anhydrous NaCN and additional manufacturing costs.

Accordingly, there is a need for a NaCN composition that can be inexpensively produced and packaged in sufficiently high NaCN weight percentage concentrations, with low risk to the environment when shipped over distances, and efficiently dissolved into solution upon delivery to the consumer. There is also a need to develop a process for producing a NaCN that eliminates the need to separate, dry and compact the NaCN prior to shipment by providing a composition with a paste-like consistency which is highly desirable from the standpoint of safe transport of product to consumers.

An advantage of the present invention is that the NaCN concentration in the paste composition is sufficiently high that the cost of shipping water does not become an overriding concern. Another advantage of the present invention is that the paste composition of this invention eliminates for consumers the hazards of exposure to harmful dusts associated with handling the anhydrous NaCN briquettes, and the need to add caustic to avoid the generation of hazardous HCN vapors due to hydrolysis of the NaCN. Also an advantage of the paste compositions of this invention is that the paste incorporates sufficient base and, therefore, consumers may not need to provide additional base to avoid hydrolysis, when used in an application. Other advantages will become more apparent as the invention is more filly disclosed hereinbelow.

SUMMARY OF THE INVENTION

According to a first embodiment of the present invention, a composition is provided which comprises NaCN, a base, water, and optionally a rheology modifier.

According to a second embodiment of the present invention, a process for preparing a NaCN paste composition is provided which comprises: (a) contacting HCN with an aqueous medium comprising a base and optionally a rheology modifier at an elevated temperature; and (b) cooling the medium to provide a NaCN paste composition.

According to a third embodiment of the present invention, a process is provided which comprises contacting an ore with a composition which is the same as the composition disclosed in the first embodiment of the invention and can be produced by the process disclosed in the second embodiment of the invention.

DETAILED DESCRIPTION OF THE INVENTION

The present invention provides a NaCN paste composition that facilitates applications requiring NaCN in solution, such as electroplating, treating metal surfaces, extracting and recovering precious metals from ores, and a number of other chemical applications.

For purposes of this invention, a paste is defined as a suspension of solid particles in a liquid phase wherein the viscosity of the suspension is generally about 1 to about 500 Pa.s at 25° C. in the shear rate range of about $1s^{-1}$ to about $10\ s^{-1}$. The shear viscosity, or simply viscosity, is the proportionality constant between shear stress and shear rate for a material, and is a common measurement which can be used to characterize the fluidity of the paste compositions of this invention. As described in "An Introduction to Rheology", by H. A Barnes, J. F. Hutton and K. Walters, Elsevier, 1989, pp. 26–31, viscosity measurements may be performed in any of several types of rotational instruments employing different probe configurations: parallel plate (or disk), cone and plate, or concentric cylinder. The measurements may further be made in either of two common modes: commanded rate under steady or constant shear conditions, or commanded force under steady stress conditions. The paste compositions of this invention, characterized using a parallel disk instrument under steady shear conditions, exhibit approximate power-law shear-thinning behavior on a log-log plot of viscosity versus shear rate over the shear rate range of about 0.1 to 100 $s^{-1}$.

Such NaCN paste compositions can be inexpensively produced and packaged, and can be transported more safely than NaCN solution. The paste composition of the invention also provides the consumer with a sufficiently high NaCN weight percentage to minimize cost to the manufacturer of shipping material other than NaCN, i.e., shipping water.

According to the first embodiment of the invention, a composition is provided which comprises sodium cyanide, a base, water, and optionally a rheology modifier.

Sodium cyanide produced by any methods known to one skilled in the art can be used in the composition of the present invention. Sodium cyanide can be present in the composition at least about 45, preferably at least 55, and most preferably 60 weight % and can be in the range of about 45 to about 82, more preferably about 55 to about 80, and most preferably 60 to 75 weight percent (%), based on total weight of the composition.

According to the invention, any organic or inorganic base that can provide the pH of the composition at about 12 or higher can be used. Wishing not to be bound by theory, such high pH is believed to prevent the hydrolysis of NaCN and formation of hydrogen cyanide vapor (NaCN+$H_2O$<->NaOH+HCN). However, it is preferred that the base be selected from a metal oxide, metal hydroxide, metal hydrosulfide, metal carbonate, metal bicarbonate, hydrated metal oxide, or combinations of two or more thereof in which the metal is selected from the group consisting Group IA metal, Group IIA metal, or combinations thereof of the CAS version of the Periodic Table of the Elements, CRC Handbook of Physics and Chemistry, $67^{th}$ edition, 1986–1987, CRC Press, Boca Raton, Fla. Examples of the preferred bases include, but are not limited to, sodium oxide, sodium hydroxide, potassium oxide, potassium hydroxide, lithium hydroxide, cesium hydroxide, berrylium hydroxide, calcium oxide, calcium hydroxide, calcium hydroxide, magnesium oxide, magnesium hydroxide, sodium hydrosulfide, sodium carbonate, sodium bicarbonate, and combinations of two or more thereof. The presently most preferred base is sodium hydroxide for it is readily available and inexpensive.

Any quantity of base can be used so long as the quantity can provide the composition of the invention a pH of at least about 12. Generally, the base can be present in the composition in the range of from about 2 to about 20 percent, based on the total weight of the composition. If the composition comprises a rheology modifier disclosed hereinbelow, a base can be present in the composition in the range of from about 2 to about 15, preferably about 3 to about 12, and most preferably 3 to 7 weight %, based on the total weight of the composition. However, if the composition does not comprise a rheology modifier, the base is preferably present in the composition in the range of about 7 to about 20%.

Water can be regular tap water, deionized water, distilled water, a solution containing a dissolved base, or combinations of two or more thereof. Water can be present in the composition in any quantity so long as the quantity is sufficient to effect the production of a NaCN composition having a viscosity, as defined and measured by the method disclosed above, of about 2 to about 500, preferably about 3 to about 200 Pa.S at 25° C. in the shear rate range of about $1s^{-1}$ to about $10s^{-1}$. Generally, water is present in the composition at least about 15 weight %.

A rheology modifier can also be present in the composition of the present invention. Any material which can prevent the sodium cyanide from settling into a "rocklike" solid during dewatering of the composition can be used. The presently preferred rheology modifier is at least one metal carboxylates in which the metal of the metal carboxylates is selected from the group consisting of Group IA metals, Group IIA metals, as defined hereinabove, or combinations of two or more thereof. Examples of suitable rheology modifiers include, but are not limited to, sodium formate, sodium acetate, sodium propionate, sodium lactate, sodium citrate, potassium formate, potassium acetate, potassium tartarate, and combinations of two or more thereof. Other rheology modifiers known to inhibit crystal growth, such as water-soluble iron salts, can also be used as rheology modifiers, so long as they do not adversely affect the NaCN paste composition or end uses.

The rheology modifier, if present, can be present in the composition in the range of from about 0.01 to about 10, preferably 0.3 to about 6%, and most preferably 1 to 4 weight %, based on the total weight of the composition. However, if the base is present in the composition in the range of from about 7 to about 20 weight %, the rheology modifier can be present in the composition up to 1%, and sodium cyanide can be present in the composition in the range of from about 45 to about 78 weight %. Increasing the base concentration decreases the quantity of rheology modifier required.

Upon delivery to the consumer, the NaCN paste can be quickly and efficiently dissolved in water to form an aqueous solution. By quickly and efficiently dissolved, it is meant that the paste composition dissolves in water even at temperatures less than ambient. For example, the paste composition can dissolve in water to a concentration of 30 weight % in water within 4 hours with adequate mixing/agitation at a temperature of 15° C. This is particularly useful for consumers who may be located in cold remote sites with outdoor operations. Alternatively, the consumer may use the paste directly in a process operation.

Any of the paste compositions of this invention may contain measurable quantities of impurities, particularly sodium carbonate ($Na_2CO_3$), which is formed by the reaction of carbon dioxide (typically present in the HCN reactor gas) with NaOH neutralizing agent. The level of $Na_2CO_3$ in the final product should not be detrimental to the formation of a stable paste and is typically less than 6 weight %.

Preferably the base is NaOH due to cost, effectiveness, and ease of preparation of the paste composition. Using NaOH as the base facilitates preparation of the NaCN paste composition particularly when the NaCN solution is prepared by absorbing HCN reactor gas into a solution of NaOH, by reducing the number of steps and number of reagents needed.

The NaCN paste composition of this invention is typically free from sodium cyanide dihydrate (NaCN.$2H_2O$), even when cooled below the anhydrous NaCN/NaCN.$2H_2O$ transition temperature. The NaCN in the paste is anhydrous NaCN in the presence of water. Too high a concentration of the dihydrate, which is a rigid solid, would detrimentally affect the rheological properties of the composition. Formation of NaCN.2H$_2$O would reduce the amount of free water in the paste composition. The presence or absence of NaCN.2H$_2$O can be ascertained by X-ray powder diffraction analysis since anhydrous NaCN has a cubic structure and NaCN.2H$_2$O has a monoclinic structure.

According to the present invention, the composition can also comprise, consist essentially of, or consist of the following components, by weight percentage based on total weight of the composition: (a) about 45 to about 82% NaCN; (b) about 3 to about 20% of a base; (c) about 0.01 to 6% of a rheology modifier; and (d) at least about 15% water wherein the composition has a viscosity of less than 500 Pa.s at 25° C. in the shear rate range of about 1 to about 10s$^{-1}$. The definition, scope, and weight % of NaCN, base, rheology modifier, and water can be the same as those disclosed above.

According to the second embodiment of the present invention there is provided a process for producing a NaCN paste composition which comprises first contacting HCN or HCN reactor gas with NaOH in an aqueous medium. By HCN reactor gas, it is meant the product from a process to produce HCN. HCN reactor gas can be produced by any processes known in the art such as, for example, the Andrussow process, wherein methane, ammonia and air are reacted in the presence of a catalyst, and the BMA process wherein a hydrocarbon and ammonia are reacted in catalyst lined ceramic tubes. Because such processes are well known to one skilled in the art, description of which is omitted herein for the interest of brevity.

The contacting of HCN or HCN reactor gas with a NaOH-containing aqueous medium can be carried out at any condition sufficient to effect the production of NaCN. Such condition can include a temperature in the range of from about 25° C. to about 150° C., preferably about 30° C. to about 100° C., more preferably about 50° C. to about 90° C., and most preferably 70° C. to 85° C., under a pressure that can accommodate the temperature for a sufficient period of time, generally about 0.1 to about 10 hours.

The aqueous medium may be in the form of a solution or slurry. Preferably, HCN is absorbed into an aqueous medium comprising NaOH in an absorber, which can reduce or eliminate the need to remove water to form a NaCN paste composition. The aqueous medium can also comprise NaCN, a solution of NaCN, or both. Water content in the aqueous medium can be controlled by temperature. The absorber can be operated at high temperatures such as 90 to 100° C., to produce a NaCN slurry or NaCN paste composition or at low temperatures such as 30 to 50° C., to provide a more dilute NaCN slurry or a NaCN solution. By "dilute slurry" of NaCN, it is meant herein to describe an aqueous slurry comprising NaCN wherein the concentration of water is higher than that desired in the paste composition, thereby necessitating an additional dewatering or concentrating step as part of the process to prepare the desired paste composition. Specific temperatures required to produce a desired paste composition can be calculated using the conventional water-vaper equilibrium relationship known to one skilled in the art.

In the aqueous medium comprising NaOH, the NaOH reacts with the HCN to produce NaCN. The concentration of NaOH in the aqueous medium should be sufficient to react with all of the HCN present. There is need for sufficient base present, either NaOH or other bases disclosed hereinabove in order to reduce the partial pressure of HCN and to prevent the hydrolysis of the NaCN and formation of HCN vapors. Preferably, as disclosed above, the base is NaOH. The base should also be present in an amount to provide a final concentration disclosed in the first embodiment of the invention, for example, 3 to 20%, by weight, in the product paste and a pH of at least about 12.

Optionally, a rheology modifier is added to the process. The definition and scope of the rheology modifier is disclosed in the first embodiment of the invention. The presently preferred rheology modifier is NaO$_2$CH, due to convenience and availability. It is because NaO$_2$CH can be produced in situ during manufacture of NaCN by contacting HCN with NaOH, especially at temperatures above 50° C. by the reaction:

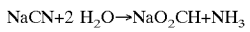

$$NaCN + 2\ H_2O \rightarrow NaO_2CH + NH_3$$

By generating NaO$_2$CH in situ, there is no need to physically add a rheology modifier to the process. The desired concentration of formate produced in situ can be obtained by adjusting the concentration or quantity of sodium cyanide base, water, or combinations of two or more thereof; temperature; time period; or combinations of two or more thereof.

Preferably the process of contacting HCN or HCN reactor gas with aqueous NaOH medium is carried out in a continuous operation. When the contacting is carried out continuously, the aqueous medium comprising NaOH will advantageously contain NaCN, especially when there is a need to concentrate or dewater the NaCN stream produced. Such a concentrating step can produce an aqueous stream that comprises NaCN. The aqueous NaCN stream derived from concentrating can be recycled.

The process of contacting HCN with, or absorbing HCN into, an aqueous medium comprising NaOH and optionally a rheology modifier produces an aqueous medium comprising NaCN. Upon cooling the aqueous medium, a NaCN paste composition comprising, consisting essentially of, or consisting of the following components, NaCN, a base, a rheology modifier, and at least about 15% water is produced, wherein the composition has a viscosity of less than 500 Pa.s at 25° C. in the shear rate range of about 1 to about 10 s$^{-1}$.

Alternatively, the process can be carried out in the absence of a rheology modifier wherein HCN is contacted with, or absorbed into, an aqueous medium comprising NaOH, which is present in sufficient quantity to result in a composition comprising the weight % of base disclosed hereinabove, to provide an aqueous medium comprising NaCN. Upon cooling the aqueous medium, there is provided a NaCN paste composition disclosed in the first embodiment of the present invention.

The above described processes wherein HCN is contacted with, or absorbed directly into, an aqueous medium comprising NaOH can advantageously provide an NaCN paste without the need for additional steps of concentrating or dewatering the NaCN product, provided the initial medium is of sufficiently high concentration of NaOH and sufficient HCN is added. However, it is also contemplated that dilute slurries of NaOH or NaOH solutions may be used, providing slurries or solutions of NaCN which may require dewatering or concentrating to produce the desired paste compositions. The dewatering step, if needed, can be carried out before or after the aqueous medium comprising NaCN is cooled. Any of a number of standard processes for concentrating slurries known to those skilled in the art can be used. Such methods include, but are not limited to, evaporation at atmospheric or reduced pressure, sedimentation and filtration.

Also alternatively, the hydrogen cyanide or hydrogen cyanide reactor gas can be absorbed into the aqueous medium comprising sodium hydroxide which is in an absorber-crystallizer The absorber-crystallizer generally comprises a circulating crystal slurry thereby enabling a contemporaneous evaporation and crystallization. The contemporaneous or simultaneous evaporation and crystallization for producing sodium cyanide is known to one skilled in the art and is disclosed in U.S. Pat. No. 4,847,062, disclosure of which is herein incorporated by reference.

In an alternative process, a NaCN paste can be prepared from solid NaCN. In this process, solid NaCN, for example, in the form of anhydrous NaCN crystals or $NaCN.2H_2O$, "dihydrate", is mixed with water, a base, and optionally a rheology modifier. Sufficient base is added to provide a concentration of 3 to 20% base and a pH of at least about 12 in the product paste composition. The need for a rheology modifier depends as described above, on the concentration of base in the final paste composition. At base concentrations of 7 to 20%, a good paste composition can be produced in the absence of a rheology modifier.

It should be noted that even if the processes used to prepare and/or dewater the NaCN solution are carried out at temperatures above about 35° C., there is minimal formation of the $NaCN.2H_2O$ dihydrate upon cooling to ambient temperatures. Wishing not to be bound by the theory, it is believed that the sufficient base concentration (alkalinity) and the optional presence of a rheology modifier promote formation of a NaCN composition, which upon concentrating or dewatering is intermediate between a solution and a solid; which does not form the NaCN dihydrate complex; and which retains paste-like properties at ambient temperatures.

According to the third embodiment of the present invention, a process is provided which comprises contacting ores with a composition which is the NaCN paste composition disclosed in the first embodiment of the present invention. The paste composition can be used directly, e. g., from a shipping container. If necessary, the paste composition may be heated in the shipping container and transferred for use.

Alternatively, a step of a process for treating ores can involve dissolving the paste composition in water to form an aqueous solution, typically having a concentration of 20 to 30% NaCN. Dissolution of the paste can be achieved by, but is not limited to, the following procedure: heating a shipping container, which contains the NaCN paste composition, to a sufficiently high temperature, and by circulating water or a dilute NaCN solution through the shipping container to a storage vessel for storing the NaCN solution. Ideally, the circulating water or diluted NaCN solution is injected into the shipping container at a high velocity and impinges on the surface of the paste. A broad range of dissolution methods can be employed, as are known to those skilled in the art.

Both temperature and the relative amounts of the components in a NaCN paste composition will affect the rate of dissolution of the paste composition. Higher temperatures and lower solids content provide faster dissolution rates. Preferably dissolution temperature is in the range of 35° C. to 50° C. However, at remote mining sites, local water temperatures that are close to 0° C. are sufficient to dissolve the paste.

Since the paste composition has a high concentration of base, consumers may not need to add base, when using either the paste composition directly, or as a NaCN solution. Base frequently needs to be added when treating ores with NaCN solutions to reduce the partial pressure of HCN and prevent generation of HCN fumes.

The paste composition or the dissolved solution is contacted with an ore, which causes the metals to be leached from the ore. Because leaching metals from ores is well known to one skilled in the art, description of which is omitted herein for the interest of brevity. The paste composition can also be used in other processes such as, for example, electroplating, and metal surface treatment.

EXAMPLES

The following examples are intended to illustrate and not limit the invention. Unless otherwise indicated, all percentages are by weight, based on the total composition.

Example 1

This example illustrates an evaporative method for producing a NaCN paste composition. In a suitable reaction flask, the following reagents were added with stirring to form a mixture: 110.4 g $H_2O$; 7.8 g sodium hydroxide, NaOH (s, pellets); 3.9 g sodium formate, $NaO_2CH$ (s); and 1.9 g sodium carbonate, $Na_2CO_3$ (s).

The mixture was heated in a water bath maintained at about 70° C. When all of the reagents were dissolved, 86.0 g of NaCN (granular solid) was added with continued stirring. After about 20 minutes, the NaCN was completely dissolved and the reaction flask was removed from the water bath and placed on a rotary evaporator. Water was removed under vacuum at about 1 to 2 mm Hg at a temperature of about 40–45° C. Concentration of the solution continued for about two hours until 80.7 g of $H_2O$ had been removed. The product thus formed had the following composition: 66.5% NaCN, 6.0% NaOH, 3.0% $NaO_2CH$, 1.5% $Na_2CO_3$, and 23.0% $H_2O$.

The product composition was cooled to room temperature (about 25° C.) where it exhibited excellent paste-like characteristics even after prolonged natural aging at room temperature for several months. The viscosity of this composition was 40.2 Pa.s at 1 $s^{-1}$ and 7.7 Pa.s at 10 $s^{-1}$ shear rate as determined at 25° C. using a rotational viscometer with a parallel disk configuration under steady shear conditions.

Example 2

In this Example, a sodium cyanide paste composition was prepared by direct combination of components to produce an equilibrium composition. In a suitable reaction vessel, 16.0 g of 50% aqueous sodium hydroxide solution, 6.0 g of sodium formate, and 3.0 g of anhydrous sodium carbonate were dissolved with stirring in 40.0 g of deionized water at room temperature. Once dissolved, 135.0 g anhydrous sodium cyanide (ground, $d_{50}$ approx. 50 microns) was gradually added with stirring until the solid was completely blended with the liquid phase (about 2–3 minutes) to produce a mixture. At this point the mixture was covered with clear plastics to minimize evaporative loss and heated, with occasional stirring, in a water bath maintained at approximately 70° C. until equilibrium saturation of the mother liquor was achieved (about 30–60 min.). The resultant product mixture was cooled to room temperature where it retained a semi-fluid, paste-like consistency with a viscosity of 46.2 Pa.s at 1 $s^{-1}$ and 9.4 Pa.s at 10 $s^{-1}$, both measured at 25.0° C. The final paste composition was 67.5% NaCN, 4.0% NaOH, 3.0% $NaO_2CH$, 1.5% $Na_2CO_3$, and 24.0% $H_2O$. The composition retained excellent paste-like characteristics even after several months of natural aging at room temperature.

Examples 3–8

The following examples were prepared using the direct combination method described in Example 2 at the 200- gram scale. These experiments are outlined in Table 1. The results for Example 2 were repeated for comparison.

TABLE 1

| Example No. | NaCN (%) | NaOH (%) | NaO₂CH (%) | Na₂CO₃ (%) | H₂O (%) | Solids (%) | Viscosity at 1 s⁻¹ (Pa·s) | at 10 s⁻¹ (Pa·s) |
|---|---|---|---|---|---|---|---|---|
| 2 | 67.5 | 4.0 | 3.0 | 1.5 | 24.0 | 76.0 | 46.2 | 9.4 |
| 3 | 62.5 | 12.0 | 0 | 1.5 | 24.0 | 76.0 | 64.1 | 16.7 |
| 4 | 54.5 | 4.0 | 3.0 | 1.5 | 37.0 | 63.0 | 12.2 | 2.9 |
| 5 | 61.5 | 4.0 | 3.0 | 1.5 | 30.0 | 70.0 | 21.7 | 3.5 |
| 6 | 70.5 | 4.0 | 3.0 | 1.5 | 21.0 | 79.0 | 100.9 | 16.9 |
| 7 | 73.5 | 4.0 | 3.0 | 1.5 | 18.0 | 82.0 | 157.4 | 24.7 |
| 8 | 64.5 | 15.0 | 4.0 | 1.5 | 15.0 | 85.0 | 87.1 | 30.8 |

The resultant compositions all exhibited excellent paste characteristics as evidenced by the viscosity data. Generally, paste fluidity decreases (higher viscosity) with increasing percent solids as shown in Examples 4, 5, 2, 6 and 7. This trend could be modified, if desired, depending upon the relative concentration of NaCN, NaOH, and NaO₂CH, as observed by a comparison of the compositions in Examples 2 and 3, and examples 7 and 8. The results in Example 3 further show that excellent paste characteristics in the absence of rheology modifier, at high NaOH concentration, was obtained.

Example 9

This example illustrates that an alternate base, potassium hydroxide (KOH), can be used in place of the excess NaOH to prepare a paste composition of this invention. In this example, the same direct combination approach was used as in Example 2, except that 11.0 g KOH (solid pellets), 6.0 g NaO₂CH, 3.0 g Na₂CO₃, and 132.0 g NaCN were equilibrated with 48 g H₂O. An excellent paste was produced which was 76.0% solids content with a viscosity of 41.9 Pa.s at 1 s⁻¹ and 10.9 Pa.s at 10 s⁻¹ shear rate.

Example 10

This example illustrates dissolution of a NaCN paste composition. Eighty-five grams of a sample of NaCN paste from Example 7 with the following composition: 73.5% NaCN, 4.0% NaOH, 3.0% NaO₂CH, 1.5% Na₂CO₃, and 82.0% total solids, was loaded into a stoppered, narrow-form beaker fitted with a vertical inlet nozzle and an outlet tube positioned just above the paste surface. The paste sample was equilibrated to approximately 2–4° C. prior to the start of the dissolution experiment. Using a peristaltic pump, 123.3 g of deionized water maintained at approx. 13–15° C. was circulated through the dissolution vessel at a flow rate of 27–28 mL/min (approximate nozzle velocity of 2.3 m/s). This quantity of water used was such that the final solution was 30% NaCN when the paste was completely dissolved. The time required to completely dissolve the paste in this experiment was 400 min.

Examples 11–25

The dissolution process of Example 10 was repeated on other paste samples of the same composition, with conditions varying as shown in Table 2. Examples 20–25 have lower percent NaCN in order to give the overall percent solids indicated.

TABLE 2

| Example No. | Paste % Solids | Paste Temp. (° C.) | Dissolving Water Temp. (° C.) | Flow Rate (mL/min) | Dissolving Time (min) |
|---|---|---|---|---|---|
| 10 | 82 | 4 | 15 | 27 | 400 |
| 11 | 82 | 23 | 15 | 27 | 400 |
| 12 | 82 | 4 | 15 | 55 | 240 |
| 13 | 82 | 23 | 15 | 55 | 190 |
| 14 | 82 | 4 | 15 | 110 | 110 |
| 15 | 82 | 23 | 15 | 110 | 85 |
| 16 | 82 | 4 | 10 | 27 | 400 |
| 17 | 82 | 4 | 20 | 27 | 250 |
| 18 | 82 | 4 | 30 | 27 | 210 |
| 19 | 82 | 4 | 40 | 27 | 150 |
| 20 | 76 | 4 | 15 | 27 | 390 |
| 21 | 76 | 4 | 15 | 110 | 200 |
| 22 | 70 | 4 | 15 | 27 | 330 |
| 23 | 70 | 4 | 15 | 110 | 160 |
| 24 | 63 | 4 | 15 | 27 | 220 |
| 25 | 63 | 4 | 15 | 110 | 90 |

The data show that paste compositions of this invention were readily dissolved to form solutions and that the time required to dissolve the pastes generally decreased with increasing temperature and flow rate of the dissolving water, and with decreasing paste percent solids. The initial temperature of the paste had less impact on dissolving time in the range of 4 to 23° C.

That which is claimed is:

1. A paste composition comprising sodium cyanide, a base, and water wherein said composition has a viscosity of from about 2 to about 500 Pa.s in the shear rate range of about 1s⁻¹ to about 10s⁻¹.

2. The composition of claim 1 wherein said sodium cyanide is present in said composition in the range of from about 45 to about 82 weight %.

3. The composition of claim 1 wherein said sodium cyanide is present in said composition in the range of from 60 to 75 weight %.

4. The composition of claim 1 or claim 3 further comprising a rheology modifier which is present in said composition in the range of from about 0.01 to about 10 weight %.

5. The composition of claim 4 wherein said rheology modifier is sodium formate and is present in said composition in the range of from about 0.3 to about 6 weight %; and said base is sodium hydroxide and is present in said composition in the range of from about 3 to about 12 weight %.

6. A composition according to claim 1 wherein said base is present in said composition in the range of from about 2 to about 20 percent, based on the total weight of said composition.

7. A sodium cyanide paste composition, that readily dissolves in water to form a sodium cyanide solution, comprising: (a) about 45 to 82% of sodium cyanide; (b) about 3 to 20% of a base; (c) about 0 to 6% of a rheology modifier; and (d) at least about 15% water wherein the percentages are weight percents, based on the total weight of said composition, and said composition has a viscosity of from about 2 to about 500 Pa.s at 25° C. in the shear rate range of about $1s^{-1}$ to about $10\ s^{-1}$.

8. The composition of claim 7 wherein said composition comprises at least 60% of said sodium cyanide, about 3 to about 7% of said base, about 1 to about 4% of said rheology modifier, and at least about 18% water; said base is sodium hydroxide; and said rheology modifier is sodium formate.

9. The composition of claim 7 wherein said composition comprises about 45 to about 78% of said sodium cyanide, about 7 to about 20% of said base, and 0 to about 1% of said rheology modifier; said base is sodium hydroxide; and said composition has a viscosity of about 3 to about 200 Pa.s at 25° C. in the shear rate range of $1s^{-1}$ to $10\ s^{-1}$.

10. The composition of claim 5 or claim 9 further comprising from 0 to about 6 weight % of sodium carbonate, based on the total weight of the composition.

11. The composition of claim 7 or claim 8 wherein said base is a metal compound selected from the group consisting of metal oxide, metal hydroxide, metal hydrosulfide, metal carbonate, metal bicarbonate, and combinations of two or more thereof wherein the metal of said metal compound is selected from the group consisting of Group IA metals, Group IIA metals, and combinations thereof.

12. The composition of claim 11 wherein said rheology modifier is selected from the group consisting of sodium formate, iron salts, and combinations thereof and said base is sodium hydroxide.

13. The composition of claim 5 or claim 7 wherein said composition is produced by combining said sodium cyanide, said base, said water, and said rheology modifier.

14. A process for preparing a sodium cyanide paste composition comprising:

(a) contacting hydrogen cyanide or hydrogen cyanide reactor gas with an aqueous medium comprising sodium hydroxide at a sufficient temperature in the presence of sufficient base to effect the production of an aqueous medium comprising sodium cyanide; and (b) cooling said aqueous medium comprising sodium cyanide to effect the production of a sodium cyanide paste composition.

15. The process of claim 14 wherein said contacting in step(a) is carried out by absorbing said hydrogen cyanide or hydrogen cyanide reactor gas into said aqueous medium comprising sodium hydroxide; and said aqueous medium comprising sodium hydroxide is in an absorber-crystallizer which comprises a circulating crystal slurry with simultaneous evaporation and crystallization.

16. The process of claim 14 or claim 15 wherein said aqueous medium comprising sodium hydroxide further comprises a rheology modifier.

17. The process of claim 16 wherein said base is sodium hydroxide and said rheology modifier is sodium formate.

18. The process of claim 17 wherein said sodium formate is generated in situ during step (a) of said process.

19. The process of claim 14 or claim 17 or claim 18 further comprising, between step (a) and step (b), a dewatering step.

20. The process of claim 14 or claim 18 further comprising contacting said paste composition with an ore, under a condition sufficient to leach a metal from said ore.

21. A process comprising contacting an ore with a composition recited in claim 1 or claim 7 under a condition sufficient to leach a metal from said ore.

* * * * *